(12) United States Patent
Bier et al.

(10) Patent No.: US 7,552,398 B2
(45) Date of Patent: Jun. 23, 2009

(54) SYSTEMS AND METHODS FOR SEMANTICALLY ZOOMING INFORMATION

(75) Inventors: Eric Allan Bier, Palo Alto, CA (US); Alan Frederick Newberger, Berkeley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 572 days.

(21) Appl. No.: 11/136,276

(22) Filed: May 24, 2005

(65) Prior Publication Data

US 2006/0271887 A1 Nov. 30, 2006

(51) Int. Cl.
*G06F 3/048* (2006.01)

(52) U.S. Cl. .................. 715/800; 715/801; 715/802; 715/866; 715/518; 345/472

(58) Field of Classification Search ................. 715/866, 715/518, 800, 801, 802; 345/472
See application file for complete search history.

(56) References Cited

U.S. PATENT DOCUMENTS

| | | | |
|---|---|---|---|
| 5,642,502 A | 6/1997 | Driscoll | |
| 5,644,740 A | 7/1997 | Kiuchi | |
| 5,670,984 A * | 9/1997 | Robertson et al. | 345/585 |
| 5,786,820 A | 7/1998 | Robertson | |
| 5,826,261 A | 10/1998 | Spencer | |
| 5,867,164 A * | 2/1999 | Bornstein et al. | 715/236 |
| 5,933,822 A | 8/1999 | Braden-Harder et al. | |
| 5,983,170 A | 11/1999 | Goodman | |
| 6,094,648 A * | 7/2000 | Aalbersberg | 707/3 |
| 6,189,019 B1 | 2/2001 | Blumer et al. | |
| 6,208,345 B1 | 3/2001 | Sheard et al. | |
| 6,246,442 B1 * | 6/2001 | Harada et al. | 348/569 |
| 6,279,018 B1 * | 8/2001 | Kudrolli et al. | 715/234 |
| 6,289,342 B1 * | 9/2001 | Lawrence et al. | 707/7 |
| 6,300,947 B1 * | 10/2001 | Kanevsky | 715/866 |
| 6,341,169 B1 | 1/2002 | Cadorette et al. | |
| 6,344,851 B1 | 2/2002 | Roberts | |
| 6,377,259 B1 | 4/2002 | Tenev et al. | |
| 6,452,597 B1 * | 9/2002 | Goldberg et al. | 345/472 |
| 6,523,040 B1 * | 2/2003 | Lo et al. | 707/101 |
| 6,745,183 B2 | 6/2004 | Nishioka et al. | |
| 6,804,679 B2 | 10/2004 | Jevons et al. | |

(Continued)

OTHER PUBLICATIONS

E. Bier et al., U.S. Patent Application entitled "Systems and Methods for Displaying Linked Information in a Sorted Context", filed May 24, 2005.
European Search Report.

*Primary Examiner*—Weilun Lo
*Assistant Examiner*—Tuyetlien T Tran
(74) *Attorney, Agent, or Firm*—Patrick J. S. Inouye; Krista A. Wittman

(57) ABSTRACT

Techniques are presented to semantically zoom information to fit within a bounded display space. A bounded display space optionally constrained by size or shape is determined. Semantically coherent portions of information to be displayed within the bounded space are determined. Transformation rules are applied to the portion of the information to be displayed to produce a plurality of different length representations. A store of semantic zoom level information associates combinations of the different length portion representations. A desired number of information elements to be displayed within the bounded display space is determined. Iterations over the store of semantic zoom information determine combinations of different length representations that fit within the bounded display space.

36 Claims, 10 Drawing Sheets

U.S. PATENT DOCUMENTS

| | | | |
|---|---|---|---|
| 6,857,102 B1 * | 2/2005 | Bickmore et al. | 715/205 |
| 6,877,135 B1 | 4/2005 | Kamiwada et al. | |
| 7,003,442 B1 | 2/2006 | Tsuda | |
| 7,003,513 B2 * | 2/2006 | Geiselhart | 707/5 |
| 7,054,870 B2 | 5/2006 | Holbrook | |
| 7,054,878 B2 | 5/2006 | Gottsman et al. | |
| 7,058,653 B2 | 6/2006 | Okamoto et al. | |
| 7,058,883 B1 | 6/2006 | Oda | |
| 7,068,288 B1 * | 6/2006 | Good et al. | 345/619 |
| 7,143,362 B2 * | 11/2006 | Dieberger et al. | 715/764 |
| 7,165,264 B1 * | 1/2007 | Westrick | 725/40 |
| 7,260,607 B2 * | 8/2007 | Aktas et al. | 709/206 |
| 7,266,783 B2 | 9/2007 | Fujita et al. | |
| 7,269,787 B2 | 9/2007 | Amitay et al. | |
| 7,315,988 B2 * | 1/2008 | Cragun et al. | 715/864 |
| 2002/0059333 A1 | 5/2002 | Tribbeck | |
| 2003/0028560 A1 * | 2/2003 | Kudrolli et al. | 707/509 |
| 2003/0063094 A1 | 4/2003 | Smith | |
| 2003/0074350 A1 | 4/2003 | Tsuda | |
| 2003/0074366 A1 | 4/2003 | Shibanuma et al. | |
| 2003/0128212 A1 * | 7/2003 | Pitkow | 345/440 |
| 2003/0132944 A1 | 7/2003 | Smith | |
| 2003/0159113 A1 * | 8/2003 | Bederson et al. | 715/518 |
| 2004/0034770 A1 | 2/2004 | Kaler et al. | |
| 2004/0100509 A1 * | 5/2004 | Sommerer et al. | 345/864 |
| 2004/0139077 A1 | 7/2004 | Banker | |
| 2004/0165010 A1 | 8/2004 | Robertson et al. | |
| 2004/0205042 A1 | 10/2004 | Ritter et al. | |
| 2004/0205457 A1 * | 10/2004 | Bent et al. | 715/500 |
| 2004/0268393 A1 * | 12/2004 | Hunleth et al. | 725/44 |
| 2005/0005241 A1 * | 1/2005 | Hunleth et al. | 715/720 |
| 2005/0086259 A1 * | 4/2005 | Eschbach et al. | 707/104.1 |
| 2005/0154637 A1 * | 7/2005 | Nair et al. | 705/14 |
| 2005/0216186 A1 | 9/2005 | Dorfman et al. | |
| 2006/0085743 A1 * | 4/2006 | Baudisch et al. | 715/526 |
| 2006/0179032 A1 | 8/2006 | Gottsman et al. | |
| 2007/0150807 A1 | 6/2007 | Harrington | |
| 2007/0288841 A1 * | 12/2007 | Rohrabaugh et al. | 715/513 |

* cited by examiner

| ID | FIELD TYPE | LEVEL | TRANSFORMATION RULE |
|---|---|---|---|
| 1 | AUTHORS | 1 | SUBSTRING(AUTHOR [FIRST].LASTNAME,3) |
| 2 | AUTHORS | 2 | SUBSTRING(AUTHOR [FIRST].LASTNAME,5) |
| 3 | AUTHORS | 3 | SUBSTRING(AUTHOR [FIRST].LASTNAME,7) |
| 4 | AUTHORS | 4 | AUTHOR[FIRST]. LASTNAME |
| 5 | AUTHORS | 5 | FOR(I IN AUTHOR){AUTHOR[I].LASTNAME} |
| 6 | AUTHORS | 6 | FOR(I IN AUTHOR){AUTHOR[I].FULLNAME} |
| 7 | EDITORS | 1 | SUBSTRING(AUTHOR[FIRST].LASTNAME,3) |
| 8 | EDITORS | 2 | SUBSTRING(AUTHOR[FIRST].LASTNAME,5) |
| 9 | EDITORS | 3 | SUBSTRING(AUTHOR[FIRST].LASTNAME,7) |
| 10 | EDITORS | 4 | EDITOR[FIRST].LASTNAME |
| 11 | EDITORS | 5 | FOR(I IN EDITOR){EDITOR[I].LASTNAME} |
| 12 | EDITORS | 6 | FOR(I IN EDITOR){EDITOR[I].FULLNAME} |
| 13 | TITLE | 1 | FOR(I IN TITLE){IF RANK(TITLE[I])<=1} |
| 14 | TITLE | 2 | FOR(I IN TITLE){IF RANK(TITLE[I])<=2} |
| 15 | TITLE | 3 | FOR(I IN TITLE){IF RANK(TITLE[I])<=3} |
| 16 | TITLE | 4 | FOR(I IN TITLE){IF RANK(TITLE[I])<=4} |
| 17 | TITLE | 5 | FOR(I IN TITLE){IF RANK(TITLE[I])<=5} |
| 18 | TITLE | 6 | FOR(I IN TITLE){IF RANK(TITLE[I])<=6} |
| 19 | TITLE | 7 | FOR(I IN TITLE){IF RANK(TITLE[I])<=7} |
| 20 | TITLE | 8 | FOR(I IN TITLE){IF RANK(TITLE[I])<=8} |
| 21 | TITLE | 9 | TITLE |
| 22 | PUBLICATION | 1 | FOR(I IN PUBLICATION){REPLACE (PUBLICATION[I], WELLKNOW) REPLACE(PUBLICATION[I], ACRONYMS COMMON)REMOVE (PUBLICATION[I], STOPWORD)REPLACE (PUBLICATION[I], ABBREVIATIONS)} |
| 23 | PUBLICATION | 2 | FOR(I IN PUBLICATION){REPLACE (PUBLICATION[I], ACRONYMS COMMON) REMOVE (PUBLICATION[I], STOPWORD) REPLACE(PUBLICATION[I],ABBREVIATIONS)} |
| 24 | PUBLICATION | 3 | FOR(I IN PUBLICATION){REPLACE (PUBLICATION[I], ACRONYMS COMMON) REPLACE(PUBLICATION[I],ABBREVIATIONS)} |
| 25 | PUBLICATION | 4 | PUBLICATION |
| 26 | PUB_DATE | 0 | NIL |
| 27 | PUB_DATE | 1 | DATE(PUBLICATION_DATE,2) |
| 28 | PUB_DATE | 2 | DATE(PUBLICATION_DATE,4) |
| 29 | PUB_DATE | 3 | DATE(PUBLICATION_DATE) |

FIG.8

| 3 | 0 | 1 | 1 |
|---|---|---|---|
| 4 | 0 | 1 | 1 |
| 5 | 0 | 1 | 1 |
| 5 | 1 | 1 | 1 |
| 5 | 2 | 1 | 1 |
| 5 | 3 | 1 | 1 |
| 6 | 3 | 1 | 1 |
| 6 | 3 | 1 | 2 |
| 6 | 3 | 2 | 2 |
| ↑710 | ↑720 | ↑730 | ↑740 |

SYSTEMS AND METHODS FOR SEMANTICALLY ZOOMING INFORMATION

This invention was made with Government support under MDA904-03-C-0404 award by ARDA. The Government has certain rights in this invention.

INCORPORATION BY REFERENCE

This Application is related to: entitled "SYSTEMS AND METHODS FOR DISPLAYING LINKED INFORMATION IN A SORTED CONTEXT" by Eric A. BIER et al., filed on an even date herewith, as U.S. patent application Ser. No. 11/136,255, herein incorporated by reference in its entirety.

BACKGROUND OF THE INVENTION

1. Field of Invention

This invention relates to information visualization.

2. Description of Related Art

Conventional visualization systems provide for the display of large quantities of information. However, as the quantity of visualized items increases, the detail associated with each item is reduced. Conventional visualization systems include, for each item, how much space to give the item. If the user opts to display large items, then a smaller number of items will fit on the screen. Items that don't fit on the screen will be completely invisible. Conversely, if the items are made small, more of them will fit on the screen but less screen space will be available to display information about individual items. Visualizations in which small size items are not differentiated based on their on-screen appearance prevent the user from visually scanning the visualization for patterns. Thus, users of these conventional visualization systems cannot exploit spatial cues to determine which items are close to each other, which items are in which regions and so forth. Thus, systems and methods that provide means for determining semantically expressive fields or portions of information elements for display would be useful.

SUMMARY OF THE INVENTION

The systems and methods of this invention provide means for determining semantically coherent fields or portions of information elements for display. A bounded display space constrained by size and shape and a number of information elements is determined. The information elements are decomposed into semantically coherent fields or portions based on finite state machines, rule based systems, sets of regular expression, and the like. Different length representations of each field or portion are determined. A semantic data structure is determined that reflects monotonically ordered combinations of the different length representations. Each combination is associated with a semantically zoomed representation. The data structure is a list, an array and/or system for storing ordered combinations of different length field representations. As the dimensions of the bounded display space are changed, a combination of different length representations that fit within the bounded display space is selected. The informational content of the semantically zoomed information elements is adjusted to provide useful and expressive information within the bounded display space.

BRIEF DESCRIPTION OF THE DRAWINGS

FIG. 8 is an exemplary data structure for storing transformation rules according to this invention;

FIG. 11 is an exemplary data structure for storing sematic zoom levels according to this invention.

DETAILED DESCRIPTION OF EXEMPLARY EMBODIMENTS

Figure 1:
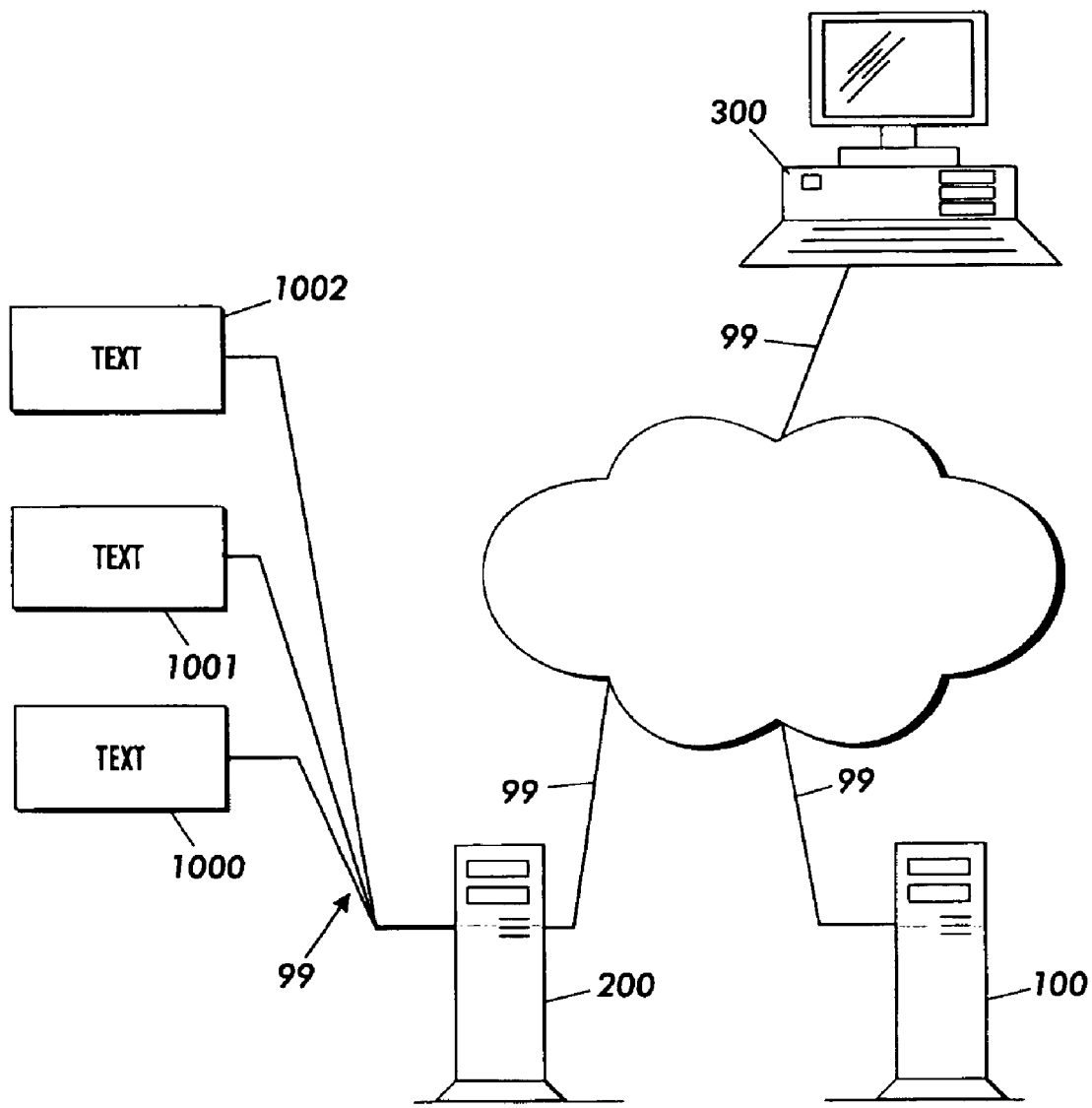
FIG. 1 is an exemplary overview of a system for semantically zooming information according to this invention.

FIG. 1 is an exemplary overview of a system for semantically zooming information according to this invention. A communications-enabled personal computer 300; and an information repository 200 providing access to documents 1000-1002, are both connected to a system for semantically zooming information 100 via communications links 99.

A user of the communications-enabled personal computer 300 initiates a request to review one or more citations. The one or more citations may be individual citations, a set of one or more citations, a group or groups of linked citations, one or more citations graphs and/or any other combination of citations. In one exemplary embodiment according to this invention, the request is mediated by the system for semantically zooming information 100. The system for semantically zooming information is optionally embedded within the personal computer, embedded within the information repository and/or located at any location accessible via the communications links 99.

The system for semantically zooming information receives the request to review citations and retrieves the relevant documents and/or citations from the information repository 200. The citations may be embedded within the text of documents, and/or stored within a citation database such as Citeseer or the like. The system for semantically zooming information 100 retrieves the relevant citation information, a bounded display space in which the citations are to be displayed and the number of citations to display.

The system for semantically zooming information 100 adjusts the informational content of the citations in order to display the required number of citations within the bounded display space. The semantically zoomed information preferentially includes more salient information in the display of the citations. The salience measure is set by the user and/or under program control. The informational content of the citations is dynamically adjusted to fit within the bounded display space. The semantically zoomed information is then forwarded over the communications links 99 to the user of the communications-enabled personal computer 300.

It should that apparent that in various other exemplary embodiments according to this invention, the system for semantically zooming information 100 may be embedded within a computer, an information repository such as a web server and/or placed at any other location accessible over communications-enabled link 99 without departing from the spirit or scope of this invention.

Figure 2:
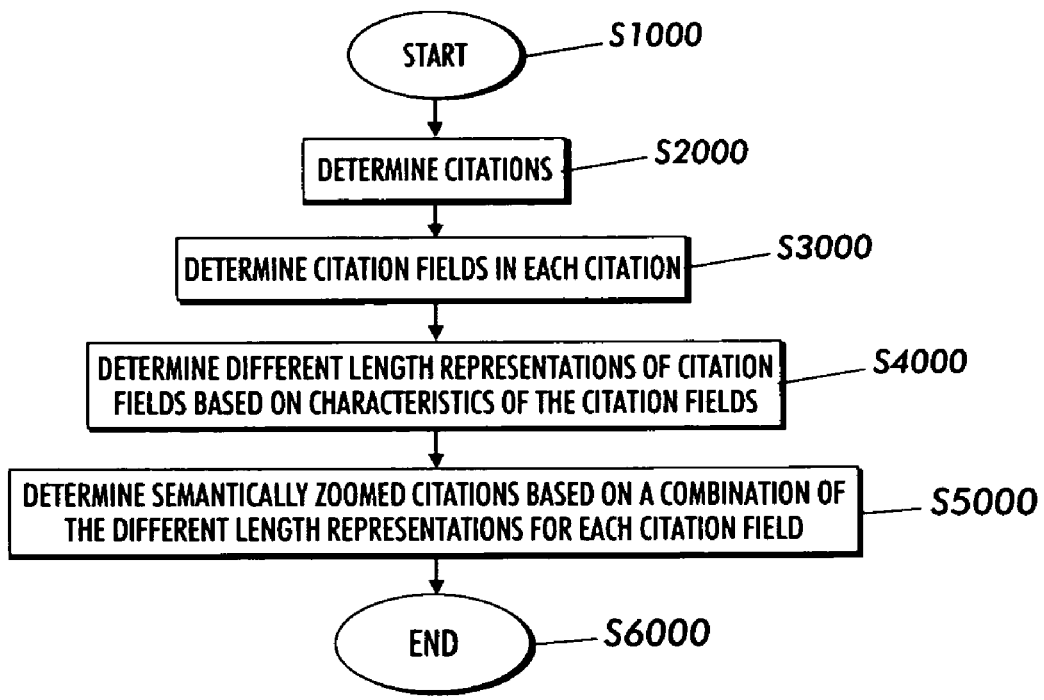
FIG. 2 is a flowchart of an exemplary method of semantically zooming information according to this invention.

FIG. 2 is a flowchart of an exemplary method of semantically zooming information according to this invention. The process begins at step S1000 and immediately continues to step S2000. In step S2000, an information element such as a citation is determined. In various exemplary embodiments, the citation information is extracted from a document, a database and/or any other source of citation information. Once the citation information has been determined, control continues to step S3000.

In step S3000, the citation fields are determined. The citation fields may vary depending on the type of citation and/or the type of document containing the citation. For example, in one exemplary embodiment, a finite state machine, rules and/or other means are used to recognize citation field information. The citations fields may include, but are not limited to: authors; editors; translators; title; source; volume; number; pages; month; day; year; publisher; location; ISBN number; author's organization; uniform resource locator (URL) information; user specific information such as document nicknames and the like. However, it should be apparent that any recognizable field, sub-field or portion of the citation information may be used without departing from the spirit or scope of this invention. After the fields or portions of the citations have been determined, control continues to step S4000.

In step S4000, different length representations of each citation field are determined based on the characteristics of the field. The different length representations reflect the application of various reduction transformations to the citation field. The different transformations are applied to the citation fields based on the characteristics of the citation field. In one exemplary embodiment, reduction transformations are applied to the author and editor citation fields to create semantically compressed representations of fields, sub-fields and/or other portions.

For example, in one exemplary embodiment, the one or more author name sub-fields in a citation are associated with first name, middle name and last name sub-sub-fields. Various length representations of the sub-fields are determined by transformations which omit the less salient middle name sub-sub-fields, omit and/or abbreviate the first name sub-sub-fields and truncate the last name sub-sub-fields and perform other transformations. Abbreviations, nickname substitutions and/or various other transformations useful in compressing the fields, sub-fields and or portions are also used. Transformations that start at the most informative portion of a field and which include progressively more salient portions are also used in the practice of this invention. The pre-computation of the different length field representations is optionally coupled with a list of combinations of field representations that facilitates smoother display transitions.

It should be apparent that, monotonically increasing or decreasing combinations of field representations are generally added to the list of combinations. The list of combinations is a list of created strings, each of which has a unique length, and which are sorted in order of increasing length. When different level representations of a field produce strings of equal length, duplicate combinations of the field representations may be created. In some exemplary embodiments according to this invention, the duplicates are not added-to-the list but are-discarded. The representation of any given field may still contain duplicates since a level i field representation is sometimes the same as the level i+1 representation.

Transformations are similarly applied to the title field of the citation to generate different length title field representations. Different transformations may be used to choose important words for a title field representation based on the term-frequency-inverse-document-frequency scores of a word, a sequence of words, a focus of attention score for portions of the title, abbreviating and/or truncating words in the title, natural language processing of the title based on syntax, semantics, part of speech classifications and the like.

For example, in one exemplary embodiment, a relevance computation is performed and various abbreviations are applied. Additional title field representations are then determined based on the relevance scores. The "n" most relevant words in the title field are selected and optionally abbreviated to fit within the bounded display space. Markers are optionally inserted to inform the user of the omitted information.

In another exemplary embodiment according to this invention, title words are ordered or ranked by length and/or position in the title. Larger words are associated with a higher ranking. Words of the same length are further ordered by position in the title, with earlier words given higher ranking than later words. Successively lower ranked title words are then added to generate successively longer title field representations. It should be apparent however, that any known or later developed method of ranking title words can also be used in the practice of this invention.

The publication field of the citation is optionally transformed by abbreviation transformations, acronym substitution transformations, discarding less informative elements of the publication, and the like. However, it should be apparent that any type of transformation useful in determining publication field representations that fit within the bounded display space is use-able in the practice of this invention.

In other exemplary embodiments, no transformations of the citation fields occur if there is sufficient space to display the full citation. On some embodiments, the mapping of two semantically zoomed citations into the same visible display information is detected. The transformations ensure that the field representations are visually disambiguated by adding disambiguating symbols or the like to the otherwise identical semantically zoomed citations. For example, extra letters may be added to the end of citations like "Bier 04a" and "Bier 04b", the priority of with which the fields are added may be changed to differentiate the citations based on a portion of the first name, such as "J Smith 02" and "P Smith 02", change the effective scores of sub-fields to ensure different words are chosen for titles such as "Bier Zoom 04" and "Bier Doc. 04" and/or perform any known or later developed methods that disambiguate the citations.

In various other exemplary embodiments, the year information is transformed by reducing the number of characters displayed in the date formats. Thus, a long-form date format such as Mar. 22, 2003 is transformed into the numeric date format representation of "2003-03-22". Additional and/or other transformations are applied to shorten the four digit year format to a two digit year format such as "22/03/03" or "03".

The transformation rules may include generally accepted rules such as Harvard Blue Book rules, ACM citation rules, IEEE citation rules, personal citation rules of a user, a court or jurisdiction; an organization and/or any other known or later developed group of transformation rules. After the different length representations of the citation fields have been determined, control continues to step S5000.

In step S5000, the semantically zoomed citations are determined based on combinations of monotonically increasing or decreasing lists of different length representations of each citation field. The combinations of monotonically increasing or decreasing different length representations of each citation field provide pre-computed representations of the entire citation for various sizes and shapes of bounded display space. After the semantically zoomed citations have been determined, control continues to step S6000 and the process ends.

Figure 3:
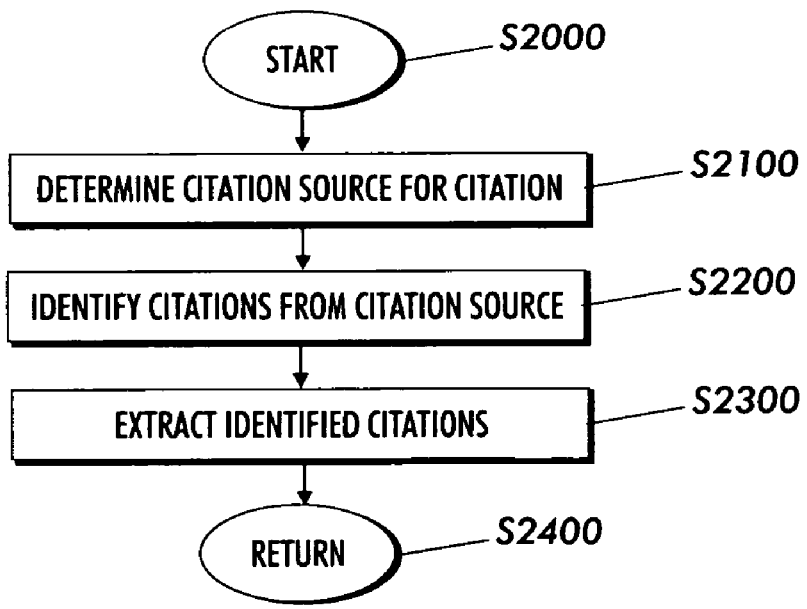
FIG. 3 is an expanded view of an exemplary method of determining citations according to this invention.

FIG. 3 is an expanded view of an exemplary method of determining citations according to this invention. The process begins at step S2000 and immediately continues to step S2100.

In step S2100, the source for the citation is determined. The citation source may include, but is not limited to, a document containing citation information, a database of citations and/or any other known-or-later developed source of citation information. For example, citations may occur as endnotes, footnotes and/or may be embedded within the text of a document. However, large collections of citations may also be stored within a database and/or other information repository. After the citation source has been determined, control continues to step S2200.

In step S2200, the citations are identified based on the source of the citation. The citation may be identified using pattern recognition, tagging, analysis of the text and/or any other known or later developed method of citation identification. In one exemplary embodiment, a finite state machine is used to identify citations in the text. However, in various other exemplary embodiments, the citations are tagged by operators using SGML, HTML, XML or the like. After the citations have been identified, control continues to step S2300.

In step S2300, the identified citations are extracted. The citations are extracted by copying the identified citation to a citation data structure and/or performing further transformations. For example, in one exemplary embodiment, an image of a document containing a citation is obtained from an image input device. The portions of the image containing the citations are identified using document analysis such as geometric and/or text based pattern matching or the like. An optical character recognition transformation document, section, paragraph, indentation level and/or other document structures and geometric information are determined and analyzed to identify the citations. Textual representations of the citations are then extracted. The textual representations are then returned and the process continues to step S2400. Control returns and immediately continues to step S3000 of FIG. 2.

Figure 4:
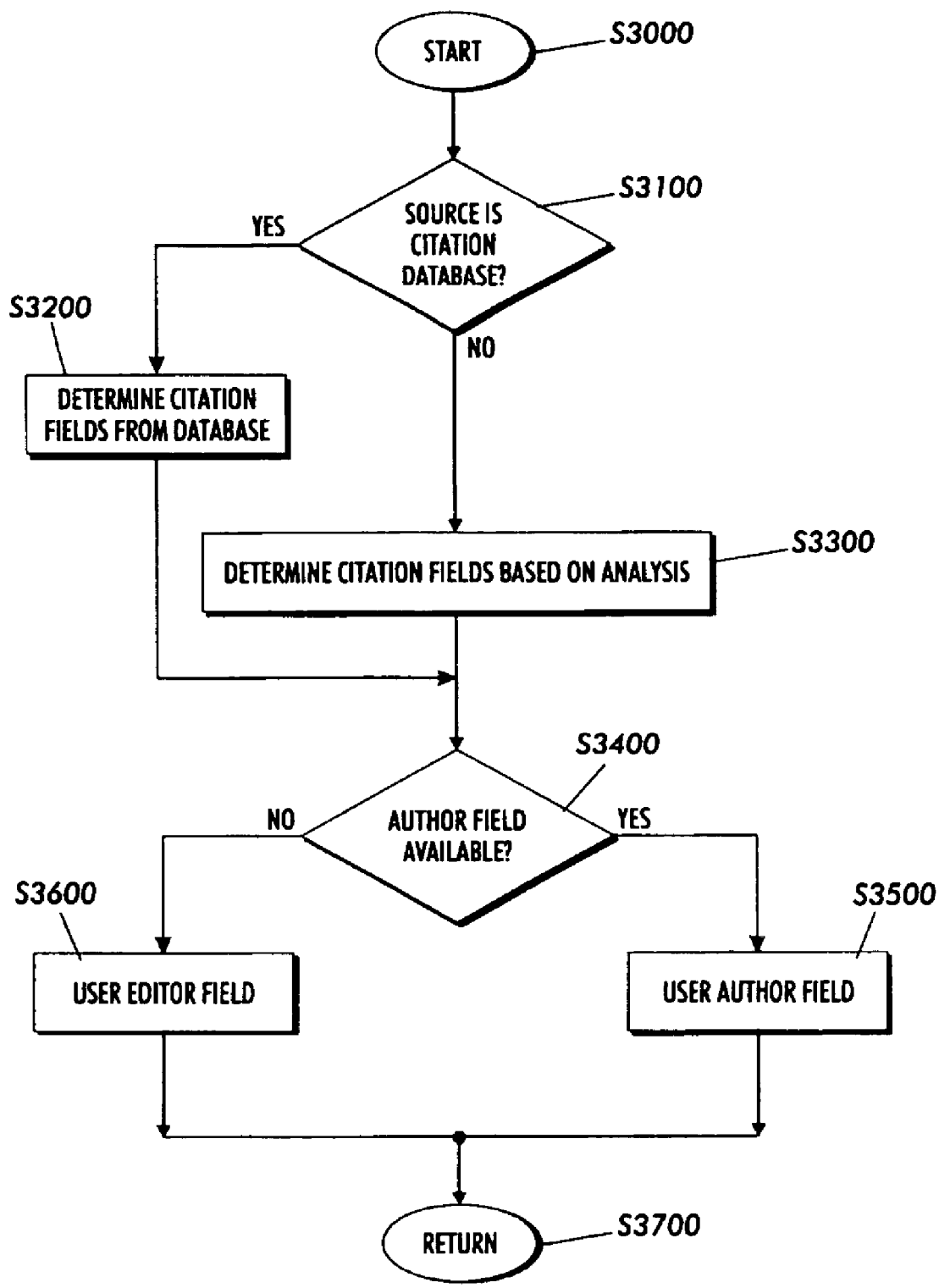
FIG. 4 is a flowchart of an exemplary method of determining citation sections according to this invention.

FIG. 4 is a flowchart of an exemplary method of determining citation sections according to this invention. The process begins at step S3000 and immediately continues to step S3100. A determination is made in step S3100 as to whether the citation source is a database. If it is determined in step S3100 that the citation source is a database, control continues to step S3200 where the citation fields are determined based on information in the citation database.

In one embodiment, the fields of each citation record are mapped to citation fields. Thus, the author, title, publication and year fields of the citation database are mapped to relevant fields of the citations. After the fields of the citations have been determined in step S3200, control continues to step S3400.

However, if it is determined in step S3100 that the source of the citation is not a database, control continues to step S3300 where the citation fields are determined based on analysis of the citation information. Citation information is analyzed using finite state machines, manual analysis by a human reviewer and/or any other method or system useful in partitioning the citation into useful fields or portions. After the citation fields have been determined, control continues to step S3400.

In step S3400, a determination is made as to whether the editor information should be used. In one exemplary embodiment, the editor information is used if no author information is available for the citation. However, it will be apparent that this determination can be selected by the user, set under programmatic control, and the like without departing from the scope of this invention.

If a determination is made that the author information is available, control continues to step S3500 and the author field is selected. Otherwise, control continues to step S3600 where the editor field is selected. After the author and/or editor fields have been chosen, control continues to step S3700, returns and immediately continues to step S4000 of FIG. 2.

Figure 5:
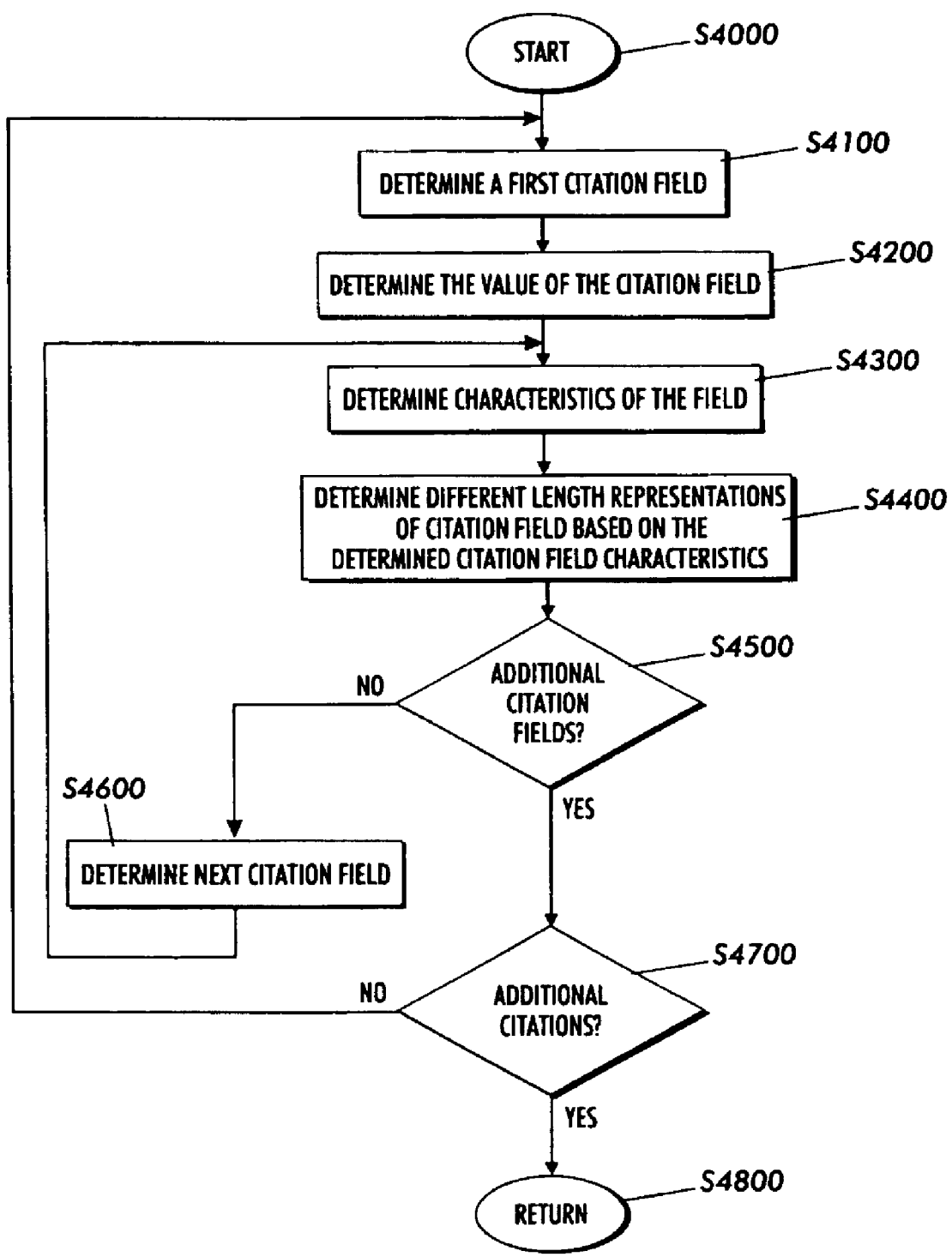
FIG. 5 is an exemplary method of determining different length representations of citation fields according to this invention.

FIG. 5 is an exemplary method of determining different length citation field representations according to this invention. The process begins at step S4000 and immediately continues to step S4100.

In step S4100, the first citation field is determined. The citation may be divided into one or more fields such as author name or names, editor name or names, title, publication name, publication year, user document nickname and/or any known or later developed attribute associated with the citation. After the first citation field has been determined, control continues to step S4200.

In step S4200, the value of the citation field is determined. For example, an author citation field might be "Peter Pirolli and Stuart K. Card". The author citation field is optionally partitioned into a number of additional sub-fields such as first name, middle name, last name and the like. For example, sub-fields for the citation author field "Peter Pirolli and Stuart K. Card" are "Peter Pirolli" and "Stuart K. Card". These sub-fields reflect the first and second authors. The first name and last name sub-sub-fields for the "Peter Pirolli" author sub-field are in turn "Peter" and "Pirolli". It should be apparent that any number of sub-fields and/or sub-portions of a citation field may be used in the practice of this invention. After the first citation field has been determined, control continues to step S4300.

In step S4300 the characteristics of the citation field are determined. The characteristics of the citation field include the role and/or the data type of the citation field. Thus, a role may indicate that a citation field contains author, title, publication date, uniform resource locator (URL) information and the like. The data type of the citation field indicates the type of information contained in the field. The data type information includes, but is not limited to, uniform resource locator (URL) information, date information, numeric information, personal names, organizational names, proper names and/or any other type of data.

In various exemplary embodiments according to this invention, transformation rules are permitted or licensed for application on a citation field based on the role and/or the type of data represented in the citation field. The transformation rules are based on the role or data type of a field, on the presence or absence of certain pre-determined strings within the citation field, sub-fields, portions of the citation field or the like.

For example, various acronym, substitution, deletion and/or other operations permissible on title information may not be permitted or licensed operations on the author's name field. Instead, authors' names are transformed using less cognitively disruptive transformations such as the removal of first and middle name sub-fields followed by right truncation on the last name sub-field. The transformation operations on uniform resource locators are similarly licensed based on the information needs and usefulness of the displayed information in disambiguating between citations. For example, transformations of uniform resource locators (URLs) include keeping or omitting the protocol name, the hostname, the port name, file path, file base name, file extension, query string and/or other URL components in order to preferentially preserve more salient portions, when the display space does not permit displaying the entire URL. The remaining part of the URL is optionally broken into multiple portions to preserve readability when displayed across multiple lines. After the characteristics of the citation fields have been determined, control continues to step S4400.

In step S4400, different length representations of the citation fields are determined based on characteristics of the citation field value. The citation field characteristics reflect the type and role of the information in each citation field. The transformation of citation information is based on the role or the data type of the citation field.

For example, transformations of URL type citation fields for documents within the same web site would start at the rightmost portion of the field since the filename portion is most helpful in this context. In contrast, when viewing documents from a number of different domains, portions from the left hand side of the URL citation field, which contain the name of the host, the file directory and/or path to the file are included. This helps in understanding the structure of the source web-site for the document and ensures that the semantically zoomed citation conveys the most useful information to the user within the bounded display space. Thus, in one exemplary embodiment, the author and/or editor information are the most important information to the user. That is, if present, the author information is the most important information. If no author information is present, then the editor information is considered the most important information and is used in place of the author information In collections or views of a collection reflecting documents for a single author, the title and year citation fields are optionally increased in importance since these fields allow the user to more easily resolve or differentiate documents by the same author. It will be apparent that in various embodiments according to this invention, the role and data type characteristics are optionally weighted and/or adjusted dynamically based on a user's traversal of a web site and the like.

In still other exemplary embodiments, the information is semantically zoomed based on explicitly or implicitly communicated user interest information. The semantic zooming is then based on preferentially increasing the information associated with the user interest profile. For example, the system for semantically zooming information 100 may chose high ranks for the words "computer" and "graphics" in the document title fields, if these words have high term-frequency-inverse-document-frequency scores. In addition, it may increase the rank of these words if the user has indicated an interest in them directly, or if the user has indicated an interest in terms that are related to them via spreading activation, latent semantic analysis, or any other determination of relatedness. Co-authoring relationships, word co-occurrence-relationships in suitable document-collections, spreading activation, knowledge ontologies, and/or any known or later developed relatedness measures are also useable to adjust the rank and/or weight of words in the citation field.

Each citation field is typically associated with a different set of transformations and/or parameters. Thus, a first representation of the author section may include 3 characters of the first author's last name. Progressively more letters and/or additional last names of the authors are then added. In one exemplary embodiment, the various combinations are pre-computed. The pre-computation of the different length representations and a semantic zooming array are useful in reducing the computational resources required. That is, the full set of monotonically non-decreasing representations are pre-computed. The combination of representations that fits the display space during user interaction can then be quickly selected. Interactive sessions are smoother and updates are less likely to unnecessarily re-direct the user's attention. Moreover, in other embodiments according to this invention, the shape of the display space is used to inform the selection of an appropriate combination of representations. For example, to display useful information from the citation representations: 1) Bie; 2) Bier; 3) E. Bier; 4) E. A. Bier 5) Eric A. Bier; and 6) Eric Allan Bier, in a constrained display space of four lines of four characters each, the $5^{th}$ combination of full first name, middle initial and full last name is selected. This occurs even though the sixth representation fits in the 16 character limit, because the middle name, "Allan" does not fit on any of the four-character lines.

The publication information is optionally transformed to substitute common and/or accepted abbreviations, acronyms and other acceptable short forms and to remove less salient information. For example, the phrase "CHI 2003 Conference Proceedings" may be re-written as: 1) "CHI 2003 Conf. Proc.", 2) "CHI 03 Proc." and 3) "CHI03."

The title information is transformed to selectively display words from the title based on relevance scores, positional scores, and/or transformations. Thus, in one embodiment, the words indicated as most important by a set of relevance and positional scores are used to form a representation of the title citation field. Multiple similarly ranked words are added in order of their position in the title to form progressively longer field representations. Thus, words appearing earlier in the title field of the citation are more likely to be included than words appearing later in the title. However, it should be apparent that these rules are merely exemplary and that various methods of transforming the citation fields may be also in the practice of this invention. After the different length citation field representations have been determined, control continues to step S4500.

In step S4500 a determination is made as to whether there are additional citation fields to be processed. If it is determined that there are additional citation fields to be processed, control continues to step S4600 where a next citation field is determined. Control then jumps to step S4300. Steps S4300-S4500 are then repeated until a determination is made in step S4500 that there are no additional citation fields to be processed. When it is determined in step S4500 that there are no additional citation fields, control jumps to step S4700.

In step S4700, a determination is made as to whether there are additional citations to be processed. If there are additional citations, control jumps to step S4100. Steps S4100-S4700 are then repeated until no additional citations remain. Control then continues to step S4800, returns and immediately continues to step S5000 of FIG. 2.

Figure 6:
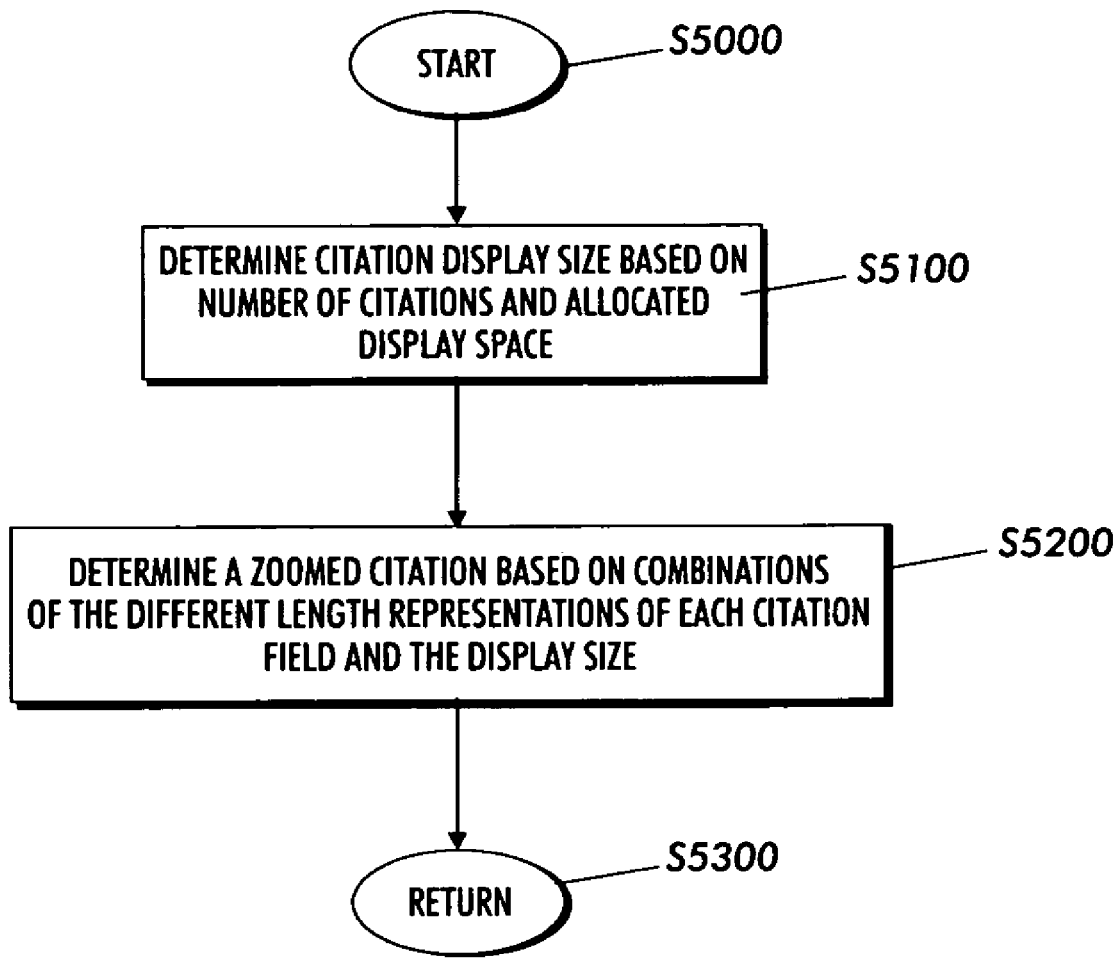
FIG. 6 is a flowchart of an exemplary method of determining semantically zoomed citations according to this invention.

FIG. 6 is a flowchart of an exemplary method of determining semantically zoomed citations according to this invention. The process begins at step S5000 and immediately continues to step S5100.

In step S5100 the citation display size is determined based on the bounded display space and the number of citations to be displayed. Each citation is typically allocated the same amount of display space. This helps to reinforce the cognitive ranking of each citation as co-equal in importance and facilitates the identification of patterns within the information.

As the bounded display space is adjusted, the informational content of the citation is semantically zoomed. The semantic zooming maintains cognitive context for the user and ensures the given citation fits within the allocated display space allowing patterns to be more easily identified.

For example, in one embodiment, the bounded display size is determined to be 30 cm×40 cm and 100 citations are to be displayed. The size of each citation display is then determined to be 6×2 cm. After the citation display size has been determined, control continues to step S5200.

In step S5200, the semantically zoomed citation is determined based on a combination of different length representations of each citation field and the display size. When used within dynamic or reactive user interfaces, thousands of calculations must be performed as the user's changing focus of attention selects new sets of citations to be displayed. In various exemplary embodiments according to this invention, the different length representations of the citation fields are pre-computed. Thus, in some embodiments, only a display size and number of citations need to be specified. The semantically zoomed citation appropriate to the available display space is then returned. In other embodiments, the size and shape of display space for each citation may be determined by a layout computation that automatically assigns screen regions to citations in order to achieve a desired spatial arrangement. In still other embodiments, the size and shape of display space for each citation may be specified interactively by the user. This allows the reactive user interface to provide smooth transitions as the user's attention changes. In particular, zooming out causes more semantically zoomed citations to appear on the screen and causes the citation information to be re-computed for each and every one of the now smaller semantically zoomed citations. While panning may cause some semantically zoomed citations to both leave and arrive on the display space, for unchanged zoom factors, the system for semantically zooming information already knows which combination of field representations to use for previously displayed semantically zoomed citations. The previously computed combination of field representations for the semantically zoomed citations is still valid, thus saving computational resources. After the semantically zoomed citation is determined, control continues to step S5300, returns and immediately jumps to step S6000 of FIG. 2 where the process ends.

Figure 7:
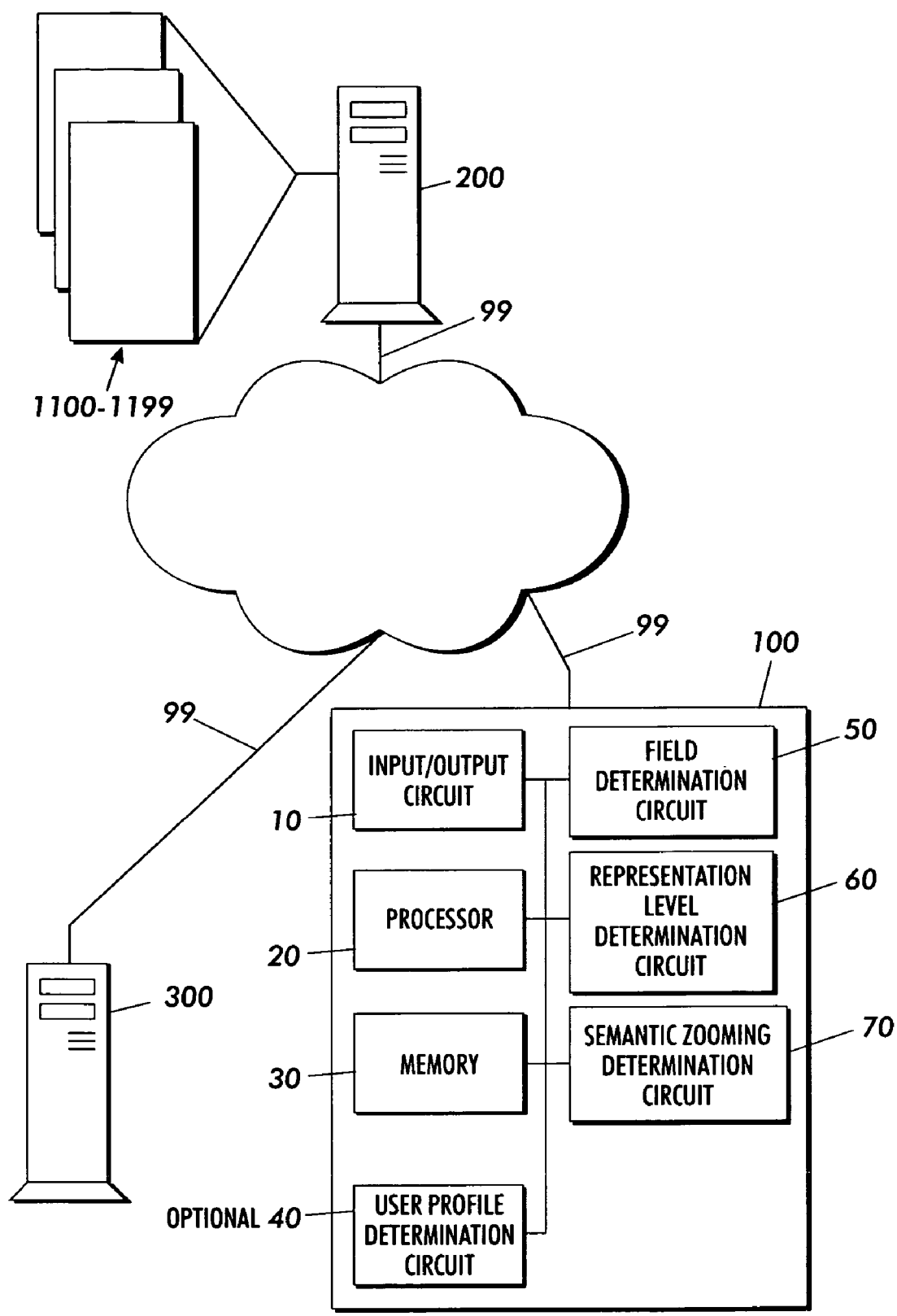
FIG. 7 is an exemplary system for semantically zooming information according to this invention.

FIG. 7 is an exemplary system for semantically zooming information 100 according to this invention. A communications-enabled personal computer 300; and an information repository 200 providing access to information elements 1100-1199, are both connected to the system for semantically zooming information 100 via communications links 99.

A user of the communications-enabled personal computer 300 initiates a request to review product description information elements associated with the documents 1100-1199. It will be apparent that in various other exemplary embodiments, the information elements include, but are not limited to contact descriptions, citations, database fields, and/or various other types of information. The one or more information elements may be individual product descriptions, contact information. In one exemplary embodiment according to this invention, the request is mediated by the system for semantically zooming information 100.

The system for semantically zooming information receives the request to review the information elements and retrieves the relevant information elements from the information repository 200. The information elements may be embedded within the text of a document, and/or stored within a database such or the like. The system for semantically zooming information 100 retrieves the relevant information elements, the dimensions of the bounded display space in which the information elements are to be displayed and the number of information elements to display by activating the input/output circuit 10.

The processor 20 retrieves and stores the information element in memory 30. The optional user profile determination circuit 40 is activated to determine the user profile. The user profile indicates keywords, subjects and/or concepts of interest to the user. The user profile is retrieved from a user profile information store based on a user identifier, determined dynamically and/or entered by the user.

The processor 20 then activates the field determination circuit 50 to determine the relevant fields, sub-fields and/or other relevant portions of the information element. For example, in one embodiment, the author and editor, journal name, publication date, journal identifier and/or any other known or later developed portions of the information element are determined. For contact information, the name, address, phone number, fax number and occupations may be used. For investor mutual fund information, fund name, ticker symbol, fund family, asking price and the like are used. For patent information, inventors, titles, assignees, fields of invention, date of filing, patent numbers and the like may be used. In still other embodiments, product identifiers, origin identifiers, quantity, price and/or other fields for product description information elements are determined.

The processor 20 activates the representation level determination circuit 60 to determine different length representations of the fields identified in the information element. For example, an author name field in the information element is represented by different length representations. A level 1 representation of the author name field reflects the most compact representation of the author field information. In one exemplary embodiment, the level 1 representation is based on the first three characters of the first author's last name.

Additional author field information is added for each higher level author field representation. An exemplary level 6 author field representation is comprised of the first, middle and last names for all the authors.

The processor 20 then activates the semantic zooming determination circuit 70 to determine which fields and/or field levels are to be include in the semantically zoomed information element based on the available display size, shape and optional user profile information. In this way, the information relevant to the task and which fits within the bounded display space is selected. The processor 20 forwards the semantically zoomed information element to the communications-enabled personal computer 300 for display.

In various other exemplary embodiments, the system for semantically zooming information 100 is embedded within the communications-enabled personal computer 300, the information repository 200 or at any other location accessible over communications links 99.

FIG. 8 is an exemplary data structure for storing transformation rules according to this invention. The exemplary data structure for storing transformations rules is comprised of an identifier portion 610; a field type portion 620; a level portion 630; and a transformation rule portion 640.

The identifier portion 610 contains the value "1" indicating the first entry in the data structure for storing transformation rules. The field type portion 620 contains the entry "AUTHORS". This indicates the type of citation field required for the rule to fire. A determination of the type of citation field permits or licenses the application of one or more associated transformations rules. In various exemplary embodiments, the transformation rules form a transformation rule hierarchy. The transformation rule hierarchy is traversed based on characteristics of the citation fields. Thus, substitutions of acronyms are authorized on the Publication field but are not permitted on the names of authors or editors. In another exemplary embodiment, word selection for a title field is based on term-frequency-inverse-document-frequency scores but word selection for authors based on term frequency inverse document-frequency scores would not be permitted.

For example, author name citation field values can be truncated since the first few characters of an author's last name still convey meaningful information. In contrast, abbreviation transformations, stop-word removal and similar substitution operations are deprecated since these operations significantly reduce the ability to understand the compressed information. In various exemplary embodiments according to this invention, a hierarchy of permissible string operations is defined based on the characteristics of the citation field. Thus, a sub-hierarchy of permissible string operations is determined for a citation sub-field based on the characteristics. In one exemplary embodiment, the hierarchy is reflected in the ordering of the transformation rule elements.

The level portion 630 contains the entry "1". This indicates the degree of compression desired. In embodiments utilizing a sub-hierarchy of authorized operations, the level value in the level portion 630 further specifies additional rules and/or parameter values for the set of authorized transformation or string rewrite operations. Thus, in one exemplary embodiment, the level "1" value indicates the greatest degree of compression is required.

The transformation rule portion 640 contains the entry "SUBSTRING(AUTHOR[1].LASTNAME, 3)". This indicates that only the first three characters of the first author's last name are used to form the level 1 author field representation. Thus, author names, such as "Ng" that are shorter than 3 letters are returned in their entirety by this rule.

The second row contains the entry "2", "AUTHORS", "2, SUBSTRING(AUTHOR[FIRST].LASTNAME, 5)". These entries indicate that the second transformation rule extracts the first five characters of the last name of the first named author and associates the result with a level 2 author field representation. Level 2 author representations for authors with 3 or fewer characters in the last name will not differ from level 1 representations. For example, in some exemplary embodiments, an array is associated with each field. The size or number of levels of the array is based on the number of different length representations.

Each level is associated with a different transformation or parameter to a transformation. By convention, level 0 reflects an omitted field, with increasing level numbers associated with field representations containing progressively more information. The highest level then represents the full or un-transformed field. It will be apparent that the ordering of the levels is merely exemplary and that any monotonically increasing and/or decreasing ordering of level numbers may be used without departing from the scope of this invention.

The third row contains the entries "3", "AUTHORS", "3", "SUBSTRING(AUTHOR[FIRST].LASTNAME, 7)". These entries indicate that the third transformation rule associated with an author level of "3" will extract the first seven characters of the author's last name. Level 3 author representations for authors with five or fewer characters in their last name will not differ from level 2 author representations.

The fourth row contains the entries "4", "AUTHORS", "4", "AUTHOR[FIRST].LASTNAME". These entries indicate that the fourth transformation rule associated with the level 4 author field will associate the first named inventor's complete last name as the level 4 author representation. It will be apparent that level 1 and level 2 representations of shorter names such "Lee" may already reflect all the characters in the first named authors full last name.

The fifth row contains the entries "5", "AUTHORS","5", "FOR(I IN AUTHOR){AUTHOR[FIRST].LASTNAME}". These entries indicate that the last name of each author associated with the citation is returned by the level 5 author field representation.

The sixth row contains the entries "6", "AUTHORS", "6", "FOR (I IN AUTHOR){AUTHOR[I]. FULLNAME}". The variable "I" is used to iterate over each author associated with the citation. For each identified author full name is concatenated with a space between each name and a semicolon is added to form a level 6 author field representation. However, it should be apparent that various other exemplary embodiments may omit fields, punctuation or other characters or symbols without departing from the scope of this invention. Thus, although sub-fields or fields are followed by punctuation in some embodiments, it will be apparent that various other known or later developed separators may also be used in the practice of this invention.

The seventh row contains the entries "7", "EDITORS","1", "SUBSTRING(EDITOR[FIRST].LASTNAME, 3)". These entries indicate that the transformation rule extracts the first three characters of the last name of the first named editor and associates the result with a level 1 editor field representation.

The eighth row contains the entries "8", "EDITORS", "2", "SUBSTRING(EDITORS[FIRST].LASTNAME, 5)". These entries indicate that the transformation rule associated with an editor level of "2" will extract the first five characters of the first named editor's last name.

The ninth row contains the entries "9", "EDITORS", "3", "SUBSTRING(EDITOR[FIRST].LASTNAME, 7)". These entries indicate that the transformation rule associated with an editor level of "3" will extract the first seven characters of the first named editor's last name. Level 3 editor representations for editors with five or fewer characters in their last name will not differ from level 2 editor representations.

The tenth row contains the entries "10", "EDITORS", "4", "EDITOR[FIRST].LASTNAME". These entries indicate that the transformation rule associated with the level 4 editor field will associate the first named editor's complete last name as the level 4 editor representation. It will be apparent that level 1 and level 2 representations of shorter names such "Lee" may already reflect all the characters in the first named editor's full last name.

The eleventh row contains the entries "11", "EDITORS", "5", "FOR(I IN EDITOR){EDITOR [I].LASTNAME}". These entries indicate that the last name of each editor associated with the citation is returned by the level 5 editor field representation.

The twelfth row contains the entries "12", "EDITORS", "6", "FOR (I IN EDITOR){EDITOR [I].FULLNAME}". The variable "I" is used to iterate over each editor associated with the citation. For each identified editor, the full name is concatenated with a space between each name and a semicolon is added to form a level 6 editor field representation.

The thirteenth row contains the entries "13", "TITLE", "1", "FOR(I IN TITLE){IF RANK(TITLE[I]<=1}". These entries indicate that the level 1 representation of the title field is associated with words having rank "1". A rank of 1 is assigned to the most important word in the title. This allows a compact semantic representation of the title to be generated.

The rank is based on term-frequency-inverse document frequency (TF-IDF) rankings, weighting based on positional order within the title and the like. Thus, it will be apparent that any transformation capable of progressively adjusting the informational content of a representation based on semantic content may also be used in the practice of this invention.

It will also be apparent that in various other embodiments directed to semantically zooming contact information, product descriptions, database views and records and/or other types of information, the transformations are determined based on the type or role of the portion of the information and/or portions of the information. Different length representations of portions of the contact, product description, mutual fund, patent and/or other information are determined.

Similarly, rows fourteen through twenty one reflect representation levels 2-9 for the exemplary title field. That is, as the representation level increases, progressively more information from the title is included in the associated representation of the title based on the rank of the title words. Progressively less important words are associated with a higher rank. All the words in the title are displayed for the level 9 representation of the title information.

The twenty second row contains the entries "22", "PUBLICATION", "1" "FOR(I IN PUBLICATION{REPLACE PUBLICATION[I].WELLKNOWN) REPLACE(PUBLICATION[I], ACRONYMS_COMMON) REMOVE(PUBLICATION[I], STOPWORD) REPLACE(PUBLICATION[I], ABBREVIATIONS)}". These values indicate that the first level of the publication representation is determined by the iterating over the strings or tokens in the publication field to identify well known publications contained within an array containing the full name of well known publications and shorter forms of the name. The publication field is then re-written with corresponding shorter forms from the WELLKNOWN array. Common acronyms in the publication field are similarly identified.

For example, in one exemplary embodiment according to this invention, the publication is compared against the "ACRONYMS_COMMON" information store containing common acronyms. The information store may be implemented as a hash table of pattern/acronym pairs, lists of pattern/acronym -pairs and/or any other data structure useful in storing pattern/acronym pairs. An exemplary pattern/acronym pair is of the form "Joint Conference on Digital Libraries" and "JCDL" or the like. For a particular level of title representation, the pattern "Joint Conference on Digital Libraries" is identified in the title field and rewritten to as "JCDL". That is, when acronym patterns match corresponding elements of the relevant field or subfield, a substitution or rewriting operation is triggered to substitute the associated acronym.

The stop-words and abbreviations in the publication field are similarly identified. Stop-words are removed and abbreviations used to re-write the publication field. The re-written or transformed publication field is then returned as a level 1 publication field representation.

In one embodiment, the level 2 publication field representation is based on the common acronym, stop-word and abbreviation transformations and the level 3 representation is based on common acronym and abbreviations replacement. Finally the level 4 publication field representation shown in row twenty 25 includes all the informational content of the publication field.

The twenty sixth row contains the entries "26", "PUB_DATE", "NIL". These entries indicate that the level 0 representation of the publication date field is associated with the NIL marker. This publication date field representation might be used in conjunction with a weighting indicator among the citation fields that indicate more title field information should be displayed in preference to the date information. The field ranking is optionally programmatically and/or user adjusted.

The twenty seventh row contains the entries "27", "PUB_DATE", "1", "DATE(PUBLICATION_DATE, 2)". These entries indicate that the level 1 representation of the publication date field is associated with a character extraction of salient information from the publication date field. The two character publication date field representation is selected when a compact representation of the year is needed. In some exemplary embodiments, the year information is programmatically added to the semantically zoomed citation to disambiguate between citations that would otherwise map to the same visible representation.

The twenty eighth row contains the entries "28", "PUB_DATE", "2", "DATE(PUBLICATION_DATE, 4)". These entries indicate that the level 2 publication date field representation is associated with a 4 character extraction from the publication date field. The level 2 publication date field representation is selected when a compact representation of the year is needed.

The twenty ninth row contains entries "29", "PUB_DATE", "3", "DATE(PUBLICATION_DATE)". These entries indicate that the level 3 publication date field representation is associated with the full publication date field. The level 3 publication date field representation is selected when a full representation of the year sub-field is required and adequate space is available.

Figure 9:
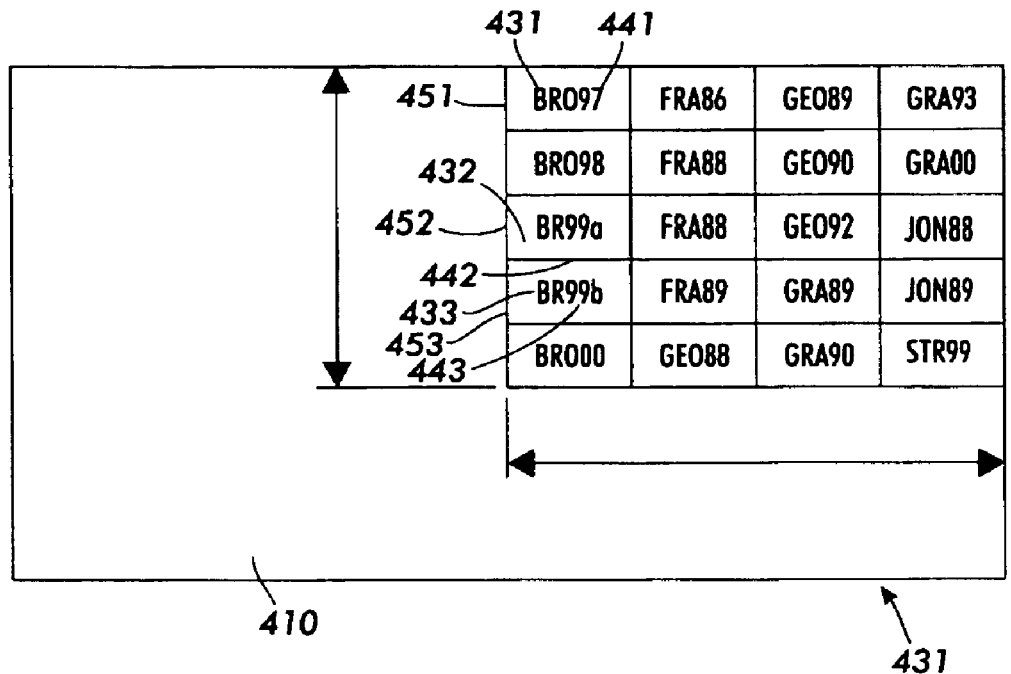
FIG. 9 shows an exemplary first display of semantically zoomed citations within a first allocated display space according to this invention.

FIG. 9 shows an exemplary first display of semantically zoomed citations within a first bounded display space 410 according to this invention. The display shows 20 citations by six different authors. A first semantically zoomed citation 451 is comprised of a level 1 author field representation 431 and a level 1 publication date field representation 441. The first semantically zoomed citation displays the first three characters of the first author's last name and an abbreviated two digit publication date field. This results in a compact display that allows identification of individual documents. It will be apparent that in various other embodiments, database fields and/or views, including product identifiers, names, wholesale and retail prices and/or various other types of information can also be used without departing from the scope of this invention.

In various exemplary embodiments according to this invention, the different length field representations of the semantically zoomed citation are pre-computed or may be determined dynamically. Pre-computation of the different length representations increases the responsiveness of the user interface. The pre-computed representations are determined and stored with the citation, stored in a citation database, determined when the citation is initially included in a working set of citations and the like.

The second and third semantically zoomed citations 452 and 453 originally map to the same visual elements. Thus, the second and third semantically zoomed citations 452 and 453 are visually disambiguated by the addition of a visual element such as a letter, a sequence or the like. In another exemplary embodiment according to this invention, semantically zoomed citations are disambiguated by adding citation information such as, page numbers, month of publication, title elements or other citation information useful in disambiguating the semantically zoomed citations.

Figure 10:
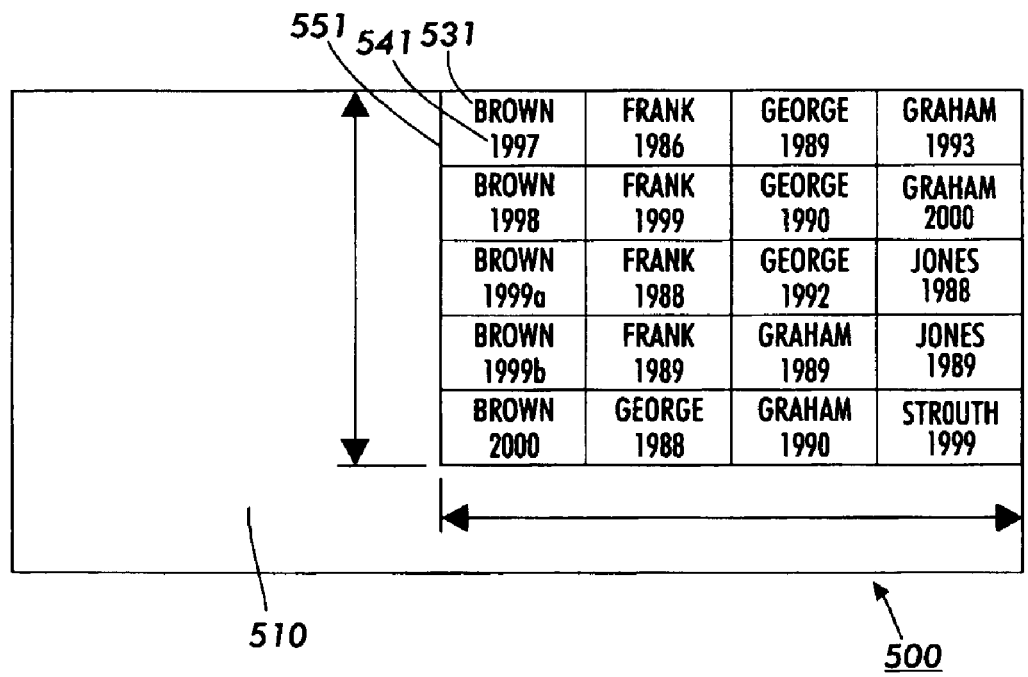
FIG. 10 shows an exemplary second display of semantically zoomed citations within a second allocated display space according to this invention.

FIG. 10 shows an exemplary second display of semantically zoomed citations within a second bounded display space according to this invention. The second bounded display space 510 allows for the display of additional information. The semantically zoomed citation 551 is comprised of a level 3 author field representation and a level 2 representation of the publication year. That is, up to 7 characters of the first named author and four characters of the year of publication are used to create the citation representation. The display is updated to reflect the different semantic zooming levels based on a semantic zooming level array. Each row in the array reflects a combination of field representations which together form a semantically zoomed citation. It should be noted the combination of field representations for each citation is generally determined independently based on a strategy of maximizing the semantic content of the result and fulfilling the size and shape constraints of the display. Thus, in a 20 character by 2 line display, more title field information is displayed for citations associated with author name "J. Yee" than for citations associated with author name "C. Strouthopoulos". However, when the priority of the title field information is explicitly or implicitly increased, the last name sub-field of the author names may be further compressed to provide additional space for the title or other important field information.

Thus, since the most informative words are chosen for display at each zoom level, the user does not need to zoom in as far to be able to successfully recognize the documents from their icons. Staying zoomed out is advantageous because it allows the user to see more icons at once thereby staying apprised of a larger grouping or context. This allows spatial cues to be used more effectively in than if the zoom level changed more drastically.

FIG. 11 is an exemplary data structure for storing sematic zoom levels according to this invention. The exemplary data structure for storing semantic zoom levels is comprised of an author portion 710; a title portion 720; a publication year portion 730; and a publication portion 740.

The first row of the exemplary data structure for storing semantic zoom levels 700 contains a value of "3" in the author portion 710. This value indicates that the associated semantically zoomed citations include a level 3 author field representation. In one exemplary embodiment according to this invention, a level 3 author field representation includes the first 7 characters of the first named authors last name. Thus, for a first author "Graham", the level of 3 author representation would be "Graham". In contrast, for a first author of "Witherspoon", the corresponding level 3 author representation would be "Withers".

The title portion 720 contains the value "0". This indicates that no title representation is to be included in the associated semantically zoomed citation. The year portion 730 contains the value "1". This indicates that a level "1" publication year field representation will be displayed in the associated semantically zoomed citation. In one exemplary embodiment according to this invention, a level 1 publication year representation includes the last two digits of the year.

The publication portion 740 contains the value "1". This value indicates that a level 1 publication field representation will be included in the associated semantically zoomed citation. The level 1 publication field representation includes substituting common acronyms into the publication field and inserting appropriate abbreviations. However, it will be apparent that various other types of transformations can also be used without departing from the scope of this invention. The resultant semantically zoomed citation is composed of specific different length representations of each field of the citation. Citations of different length, likely to fit within a bounded display space are quickly determined by examining consecutive rows in the data structure for storing semantic zoom levels.

The second row of the exemplary data structure for storing semantic zoom levels 700 contains the entries "4", "0", "1", "1". These entries indicate that the semantically zoomed citation information is composed of a level 4 author field representation; no title field representation; a level 1 publication year representation and a level 1 publication representation.

The third row contains the entries "5","0","1","1". The entries reflect semantically zoomed information composed of a level 5 author representation, no title representation, a level 1 publication year representation and a level 1 publication representation. This entry reflects additional author information displayed in the semantically zoomed citation.

The fourth row contains the values "5","1","1","1" indicating semantically zoomed citation information composed of a level 5 author representation, a level 1 title representation, a level 1 publication year representation and a level 1 publication representation. The semantically zoomed citation represented by the third row entries reflects the addition of title words to the semantically zoomed citation.

The fifth row contains the values "5", "2","1","1" indicating semantically zoomed citation information composed of a level 5 author representation, a level 2 title representation, a level 1 publication year representation and a level 1 publication representation. The level 2 title value reflects additional salient title words over the previous entry.

The sixth row contains the values "5","3","1","1" indicating semantically zoomed citation information composed of a level 5 author representation, a level 3 title representation, a level 1 publication year representation and a level 1 publication representation. This entry reflects addition title information over the previous entry.

The seventh row contains the values "6", "3","1","1" indicating semantically zoomed citation information composed of a level 6 author representation, a level 3 title representation, a level 1 publication year representation and a level 1 publication representation. This entry reflects additional author information over the previous entry.

The eighth row contains the values "6","3","1","2" indicating semantically zoomed citation information composed of a level 6 author representation, a level 3 title representation, a level 1 publication year representation and a level 2 publication representation. The entry reflects additional publication information over the previous row entry.

The ninth row contains the values "6","3","2","2" indicating semantically zoomed citation information composed of a level 6 author representation, a level 3 title representation, a level 2 publication year representation and a level 2 publication representation. This entry reflects additional publication year information over the previous row entry.

Figure 12:
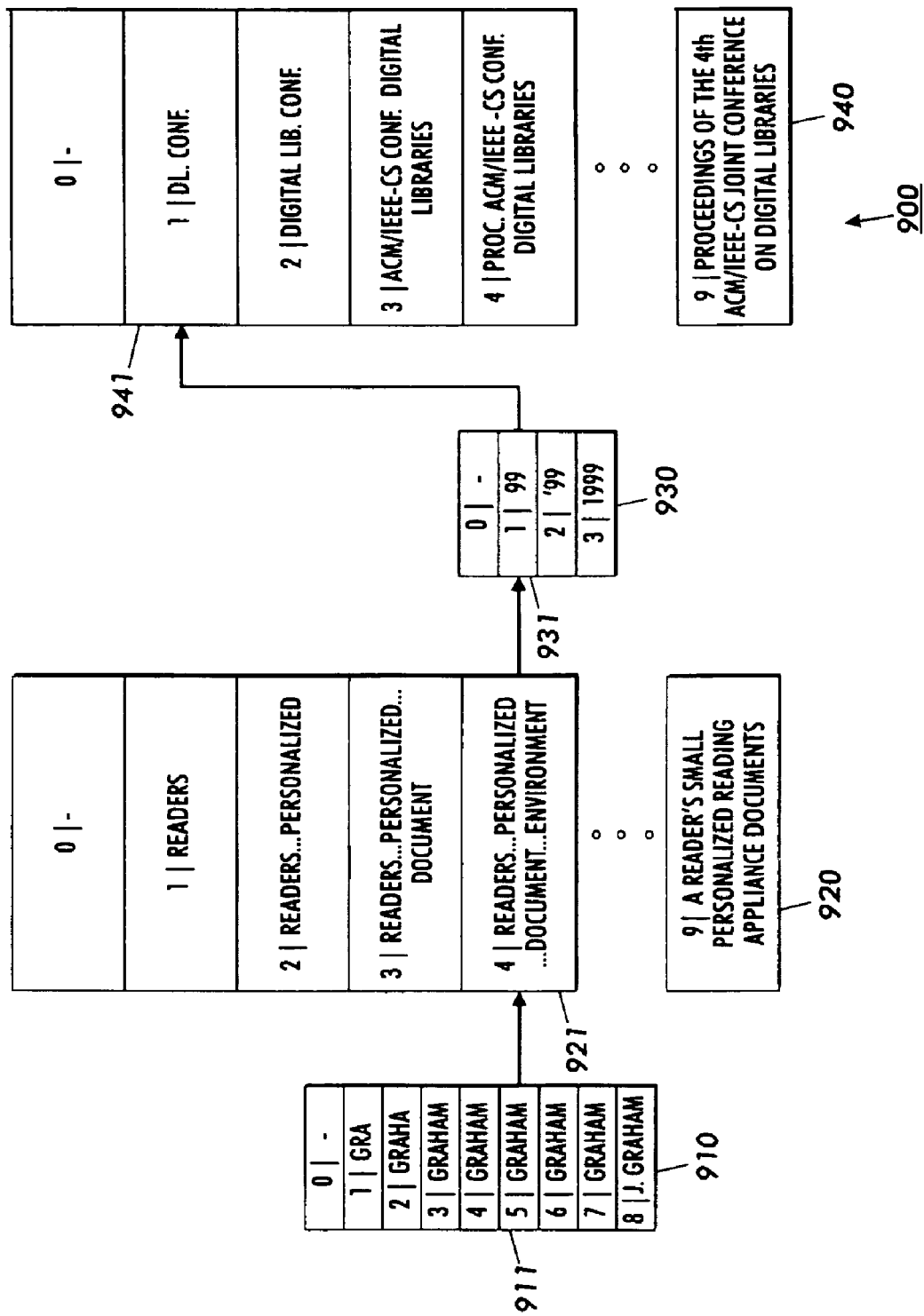
FIG. 12 is a diagram showing the formation of combination an exemplary semantically zoomed citation from combinations of different length representations according to this invention.

FIG. 12 is a diagram showing the formation of combination an exemplary semantically zoomed citation from combinations of different length representations according to this invention. The fifth or level 5 author field representation 911 is selected. The exemplary level 5 author field representation includes each author's last name.

The level 4 title field representation 921 is selected. In one exemplary embodiment according to this invention, the level 4 representation 921 includes words of rank less than or equal to 4. The rank is based on term-frequency-inverse document frequency measures, user interest, the position of the word in the title and/or any known or later developed method of ranking title words.

The level 0 publication date field representation 931 is selected from the set of publication date field representations 930 and contains no characters. The level 1 representation is chosen when the most compact semantically zoomed citation is required and the rank of the publication date indicates that the information content of the publication date field is not required.

The level 1 publication date field representation reflects the most compressed representation of the publication date field representations 930. Thus a two digit year format is returned. The level 2 publication date field reflects a four digit representation of the year. The level 3 publication date field representation reflects the full publication date field, which may include month, day, and year information, for example.

The level 1 representation of the publication field 941 is associated with operations that rewrite the publication field to include well-known acronyms, abbreviations, remove stopwords and/or which otherwise transform the publication field. Thus, the level 1 representation of the publication field 941 reflects the substitution of the acronym or nickname "DL" for the term or phrase "Digital library" and the abbreviation "Conf." for "Conference".

The selected level 5 author field representation 911; the level 4 title representation 921; the level 1 publication year representation 931 and the level 1 publication representation 941 are combined to form a semantically zoomed citation or information element. Progressively larger or smaller semantically zoomed citations are determined by selecting relevant entries in the data structure for storing semantic zooming levels.

In the various embodiments of the system for semantically zooming information 100, each of the circuits 10-50 outlined above can be implemented as portions of a suitably programmed general-purpose computer. Alternatively, 10-50 of the system for semantically zooming information 100 outlined above can be implemented as physically distinct hardware circuits within an ASIC, or using a FPGA, a PDL, a PLA or a PAL, or using discrete logic elements or discrete circuit elements. The particular form each of the circuits 10-50 of the system for semantically zooming information 100 outlined above will take is a design choice and will be obvious and predictable to those skilled in the art.

Moreover, the system for semantically zooming information 100 and/or each of the various circuits discussed above can each be implemented as software routines, managers or objects executing on a programmed general purpose computer, a special purpose computer, a microprocessor or the like. In this case, the system for semantically zooming information 100 and/or each of the various circuits discussed above can each be implemented as one or more routines embedded in the communications network, as a resource residing on a server, or the like. The system for semantically zooming information 100 and the various circuits discussed above can also be implemented by physically incorporating the system for semantically zooming information 100 into software and/or hardware system, such as the hardware and software systems of a web server or a client device.

As shown in FIG. 7, memory 20 can be implemented using a computer-readable storage medium, such as any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 7 can each be any known or later developed device or system for connecting a communication device to the system for semantically zooming information 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for semantically zooming information for display on a display device of a computer system comprising the steps of:
   maintaining citations, which each citation semantically represents a textual document and each citation comprises a plurality of sections, wherein each section comprises data associated with characteristic information, the characteristic information comprises at least one of a role and data type in the citation associated with that section;
   determining bounds of a display area;
   determining different length representations of the data for each section in one or more of the citations based on the characteristic information, wherein the different length representations reflect an application of various reduction transformations to the plurality of sections; and
   determining a semantic zoom display of the one or more citations, wherein the determining the semantic zoom display comprises:
      selecting one of the different length representations for each of the plurality of sections in the one or more citations based on the bounds of the display area and combining the selected different length representations as the semantic zoom display of the one or more citations; and
      presenting the semantic zoom display of the one or more citations for the textual document in the display area.

2. The method of claim 1, in which the semantic zoom display is based on at least one of a size and a shape of the display area.

3. The method of claim 1, in which the bounds of the display area comprise a plurality of lines and the different length representations are selected to fit within the plurality of lines.

4. The method of claim 1, in which the citations each comprise at least one of related information, linked information, hierarchically linked information and uniform resource locator (URL) information.

5. The method of claim 1, in which the citations each comprise at least one of reference, descriptive and bibliographic information.

6. The method of claim 1, in which each citation is stored in at least one of a database, a formatted string, a BibTex formatted string, an extensible markup language (XML) file, a printed page, an image document, a digital document, an in-memory document, and the associated textual document.

7. The method of claim 1, in which the sections comprise at least one of authors, editors, translators, title, source, volume, number, pages, month, day, year, publisher, location, international standard book number (ISBN) number, author's organization, and uniform resource locator.

8. The method of claim 1, in which the semantic zoom display of the one or more citations is determined based on transformations of the plurality of sections.

9. The method of claim 8, in which the transformations comprise at least one of deleting, adding and changing the data in the plurality of sections.

10. The method of claim 8, in which the transformations are performed upon the data comprising at least one of characters, words and phrases contained in the plurality of sections.

11. The method of claim 10, in which the transformations create at least one of acronyms and abbreviations for at least one of the characters, words, and phrases.

12. The method of claim 1, further comprising:
storing the combination of the selected different length representations in a storage structure comprising records, wherein each record is associated with a level and differs from prior records and subsequent records by the associated levels.

13. The method of claim 12, in which the records are stored in a monotonically increasing order based on the associated levels.

14. The method of claim 12, in which the records are stored in a monotonically decreasing order based on the associated levels.

15. The method of claim 1, in which the combination of the selected different length representations is formed based on user interest.

16. A system for semantically zooming information for display comprising:
a database that maintains citations, which each citation semantically represents a textual document and each citation comprises a plurality of sections, wherein each section comprises data associated with characteristic information, the characteristic information comprises at least one of a role and data type in the citation associated with that section;
a memory; and
a processor that determines bounds of a display area; different length representations of the data for each section in one or more of the citations based on the characteristic information, wherein the different length representations reflect an application of various reduction transformations to the plurality of sections and a semantic zoom display of the one or more citations, wherein the semantic zoom display is determined by selecting one of the different length representations for each of the plurality of sections in the one or more citations based on the bounds of the display area, by combining the selected different length representations as the semantic zoom display of the one or more citations, and by presenting the semantic zoom display of the one or more citations for the textual document in the display area.

17. The system of claim 16, in which the semantic zoom display is based on at least one of a size and a shape of the display area.

18. The system of claim 16, in which the bounds of the display area comprise a plurality of lines and the different length representations are selected to fit within the plurality of lines.

19. The system of claim 16, in which the citations each comprise at least one of related information, linked information, hierarchically linked information and uniform resource locator (URL) information.

20. The system of claim 16, in which the citations each comprise at least one of reference, descriptive and bibliographic information.

21. The system of claim 16, in which each citation is stored in at least one of a database, a formatted string, a BibTex formatted string, an extensible markup language (XML) file, a printed page, an image document, a digital document, an in-memory document, and the associated textual document.

22. The system of claim 16, in which the sections comprise at least one of authors, editors, translators, title, source, volume, number, pages, month, day, year, publisher, location, international standard book number (ISBN) number, author's organization, and uniform resource locator.

23. The system of claim 16, in which the processor determines the semantic zoom display of the one or more citations based on transformations of the plurality of sections.

24. The system of claim 23, in which the transformations comprise at least one of deleting, adding and changing the data in the plurality of sections.

25. The system of claim 23, in which the transformations are performed upon the data comprising at least one of characters, words and phrases contained in the plurality of sections.

26. The system of claim 25, in which the transformations create at least one of acronyms and abbreviations for at least one of the characters, words, and phrases.

27. The system of claim 16, in which the processor stores the combination of the selected different length representations in a storage structure comprising records, wherein each record is associated with a level and differs from prior records and subsequent records by the associated levels.

28. The system of claim 27, in which the records are stored in a monotonically increasing order based on the associated levels.

29. The system of claim 27, in which the records are stored in a monotonically decreasing order based on the associated levels.

30. The system of claim 16, in which the combination of the selected different length representations is formed based on user interest.

31. A computer-readable storage medium having stored therein computer-readable program code, the computer-readable program code when executed by a computer system performs the steps of:
maintaining citations, which each citation semantically represents a textual document and each citation comprises a plurality of sections, wherein each section comprises data associated with characteristic information, the characteristic information comprises at least one of a role and data type in the citation associated with that section;
determining bounds of a display area;
determining different length representations of the data for each section in one or more of the citations based on the characteristic information, wherein, the different length representations reflect an application of various reduction transformations to the plurality of sections; and
determining a semantic zoom display of the one or more citations, wherein the determining the semantic zoom display comprises:
selecting one of the different length representations for each of the plurality of sections in the one or more citations based on the bounds of the display area and combining the selected different length representations as the semantic zoom display of the one or more citations; and presenting the semantic zoom display of the one or more citations for the textual document in the display area.

32. A user interface for use with a computer, the user interface comprising:
    an input means for accepting input from a user;
    a display for displaying information;
    a computer-readable storage medium having stored therein computer readable program code for impementing method steps of claim 1;
    a processor that dynamically retrieves the information from an information repository based on the user input and executing the computer readable program code stored in the computer-readable storage medium to semantically zoom the retrieved information based on the method of claim 1 to fit within the display.

33. The method of claim 1, further comprising:
    adding a visual element to the semantic zoom display when other combinations of different length representations map to the semantic zoom display.

34. The method of claim 33, in which the visual element is based on the display information.

35. The system of claim 16, further comprising:
    a visual display module to add a visual element to the semantic zoom display when other combinations of different length representations map to the semantic zoom display.

36. The system of claim 35, in which the visual element is based on the semantic zoom display.

* * * * *